Patented Nov. 21, 1944

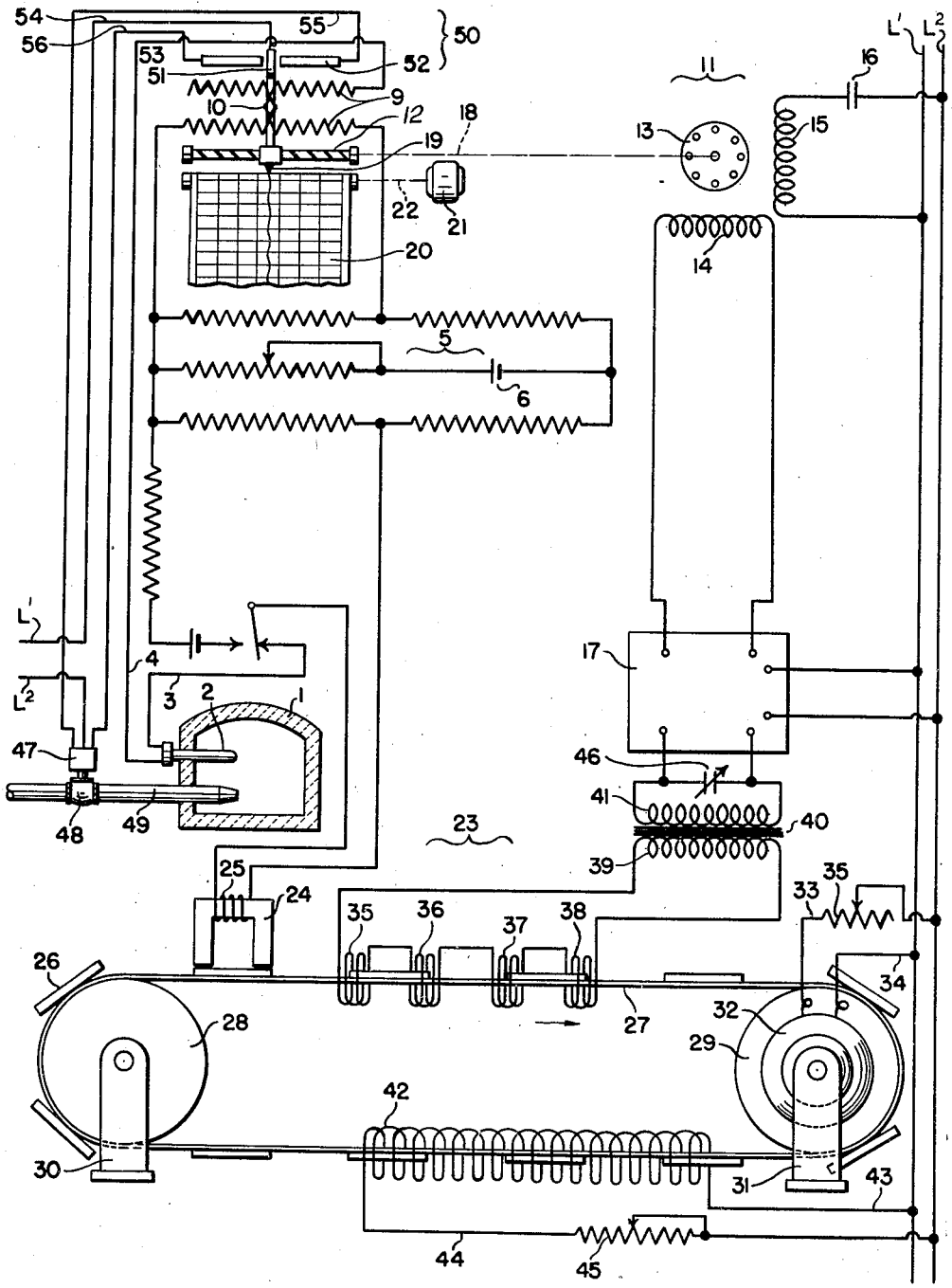

2,363,336

UNITED STATES PATENT OFFICE 2,363,336

MEASURING AND CONTROL APPARATUS

Earl A. Keeler, Norristown, Pa., assignor to The Brown Instrument Company, Philadelphia, Pa., a corporation of Pennsylvania Application March 13, 1941, Serial No. 383,149

14 Claims. (Cl. 172—239)

The present invention relates to measuring and controlling systems and more particularly to systems involving the measurement and recording of unidirectional electromotive forces of minute magnitude and their utilization for control purposes.

An object of the invention is to provide a method of measuring and/or recording the variations in magnitude of unidirectional electromotive forces of minute magnitude.

Another object of the invention is to provide a method of utilizing the changes in magnitude of minute unidirectional electromotive forces to control the operation of electro-mechanical devices.

A more specific object of the invention is to provide indicating, recording and/or controlling apparatus embodying a novel arrangement for producing an alternating electromotive force of one phase or of opposite phase upon deviation of a minute unidirectional electromotive force to be measured from a predetermined value, which alternating electromotive force may be readily amplified to control the operation of rugged electromechanical devices.

Various devices have been utilized in the prior art for measuring the magnitude, or the departure from a given magnitude, of minute unidirectional electromotive forces. One of the most satisfactory of such devices from the standpoint of accuracy and reliability is the so-called potentiometer recorder. In such devices the minute unidirectional electromotive forces are utilized directly to effect deflection of the movable element of a galvanometer or other similar sensitive instrument. This movable element, in turn, is employed to control the operation of motive means such, for example, as mechanical relay mechanism or electromechanical mechanism for rebalancing the potentiometer upon unbalance thereof.

Such prior art devices have certain disadvantages which are avoided by the use of the present invention. In the first place they are relatively expensive since they require the assembly and adjustment of a sensitive galvanometer having a delicate, deflectable element, or similar mechanism. Such galvanometer mechanisms furthermore materially curtail the ruggedness of the instrument as a whole and introduce limitations therein. For example, unless the galvanometer is of the "dead beat" type it tends to oscillate around its ultimate control position. So-called "dead beat" galvanometers on the other hand, require a considerable time interval before complete deflection is obtained, and are, therefore, unsuitable for use in apparatus designed to record rapid variations in a variable condition.

Accordingly, a feature of the present invention is to provide a recorder of the potentiometric and analogous types which is free from the limitations of the galvanometer control type. In carrying out this and other desirable features of the present invention, energy is stored in each of a plurality of suitable energy storing devices in succession under control of the unidirectional electromotive force which is to be measured, and thereafter said energy storing devices are associated with suitable means to produce an alternating electromotive force of one phase or of opposite phase depending upon a characteristic of the energy stored in said devices, which characteristic, in turn, is dependent upon the direction of deviation of the unidirectional electromotive force under measurement from a predetermined value. The alternating electromotive force so produced is utilized to control the operation of suitable electro-mechanical mechanism for rebalancing the recorder.

Specifically in accordance with the present invention, the minute unidirectional electromotive force to be measured is opposed to a unidirectional electromotive force of known magnitude and the differential therebetween is utilized to produce a magnetic field. When the opposed electromotive forces are equal in magnitude, no magnetic field will be produced since the differential electromotive force then is zero, but upon variation of the unidirectional electromotive force under measurement in one direction or the other, a magnetic field having a corresponding direction is produced. This magnetic field is utilized to magnetize a plurality of elongated bars of suitable magnetic material, which bars after being magnetized are passed in succession through one or more coils, as desired. Depending upon the direction of the magnetic field and thereby upon the direction of deviation of the unidirectional electromotive force under measurement, the bars of magnetic material will be magnetized in one direction or the other and in passing through the coils referred to will induce in the latter an alternating electromotive force of corresponding phase, that is, of one phase or of opposite phase. After the bars have been passed through the coils, the cycle of operations is completed by passing them through suitable demagnetizing means to permit their use in successive cycles of the same operation. This cycle of operation is continuously repeated and in such manner that an alternating electromotive force of one phase or of opposite phase is produced as long as the opposed unidirectional electromotive forces are unbalanced. This alternating electromotive force so induced is capable of being readily amplified and therefore of being utilized to control the operation of electrical mechanism, such as a reversible electrical motor to effect a balance between the opposed unidirectional electromotive forces. As will be apparent to those skilled in the art, the frequency of the alternating electromotive force may be controlled as desired by varying the rate at which the bars are passed through the coils.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

The single figure of the drawing is a diagrammatic representation of the use of the invention in a potentiometric recording and controlling system.

In the drawing an arrangement is illustrated for recording the variations in temperature in the interior of a furnace 1 in which a thermocouple 2 responsive to slight changes of temperature is arranged in heat transfer relation. The thermocouple 2 is connected by conductors 3 and 4 to the terminals of a self balancing potentiometric network indicated generally by the reference numeral 5, which network may be of any suitable type such as the Brown potentiometric network disclosed in Patent 1,898,124 issued February 21, 1933, to Thomas R. Harrison.

The potentiometric network 5 is of a well known type and therefore it is sufficient for the present purposes to note that it includes a circuit branch including a thermocouple 2 and an opposing circuit branch including a source of known potential such as a battery 6 and resistors 9 a variable portion of which may be connected into the opposed branches by means of a sliding contact 10 whereby the respective effects of the variable and known sources may be made equal and opposite. The potentiometric network is thus balanced for a given value of electromotive force developed by the thermocouple 2 with the contact 10 in a corresponding position along the resistors 9. The position of the contact 10 is then a measure of the value of the thermocouple electromotive force and may serve as a measure of the temperature to which the thermocouple is exposed.

In the embodiment illustrated in the drawing, the contact 10 is adjusted back and forth along resistors 9 in response to the unbalance of the potentiometer by means including a reversible electrical motor 11, the rotation and direction of rotation of which is adapted to be selectively controlled by means to be described in response to potentiometric unbalance. Motor 11 is connected in any convenient manner to contact 10 for adjusting the latter along resistors 9 and effects rebalance of the potentiometric network 5 in response to a change in the electromotive force developed by the thermocouple 2. Specifically, the shaft of motor 11 is connected to a screw shaft 12 and is adapted to adjust a carriage on which the contact 10 is mounted in one direction or the other along the length thereof as the shaft 12 is rotated.

The reversible electrical motor 11 is of the induction type and includes a squirrel cage rotor 13 and two pairs of oppositely displaced field poles of which windings 14 and 15 are wound. Winding 14 is wound on one pair of said field poles. Winding 15 is wound on the other pair of field poles and is connected in series with a condenser 16 to the alternating current supply conductors $L^1$ and $L^2$. Due to the action of condenser 16, the current which follows through the winding 15 will lead the line current by approximately 90°.

The means by which the rotation and the direction of rotation of the reversible electrical motor 11 is selectively controlled in accordance with the state of balance of the potentiometric network 5 includes an electronic amplifier 17 to the input circuit of which an alternating electromotive force of one phase or of opposite phase is adapted to be impressed upon unbalance of the potentiometric network 5 in one direction or the other, and to the output circuit of which the motor winding 14 is connected. The electronic amplifier 17 is connected to and receives energizing current from the alternating current supply lines $L^1$ and $L^2$. The alternating current supplied the motor winding 14 by the electronic amplifier 17 is substantially in phase with that of the supply lines and establishes a field in the motor which is displaced 90° in one direction with respect to that established therein by the winding 15. The reaction between the field set up by winding 14 with that set up by winding 15 establishes a rotating field in the motor which rotates in one direction or the other depending upon the direction of displacement of the fields and thus upon the direction of unbalance of the potentiometric network 5. The motor rotor is connected by suitable gearing or coupling indicated at 18 to the screw threaded shaft 12 so that the contact 10 is adjusted along the slidewire resistor 9 in accordance with the direction of the rotation of the motor. The direction and the duration of the rotation of the motor is controlled by the potentiometer unbalance so that the contact 10 is adjusted in the proper direction the precise amount to reduce the potentiometer unbalance to zero.

If desired, a pen 19 may be mounted on the carriage which carries the potentiometer slidewire contact 10 and arranged in cooperative relation with a chart 20 to thereby provide a continuous record of the temperature of the interior of the furnace 1. The chart 20 may be a strip chart, as shown, and is adapted to be driven in any convenient manner as for example by a unidirectional electrical motor 21 through gearing indicated at 22 so that a record of the temperature to which the thermocouple is subjected will be recorded as a line on the chart. It will be apparent that the slidewire resistances 9 may be mounted on a circular form, if desired, and that a circular chart may then be utilized for recording purposes in lieu of the strip chart 20.

The means referred to hereinbefore for translating the unbalanced potentiometric currents into an alternating electromotive force of one phase or of opposite phase depending upon the direction of potentiometric unbalance comprises an electromechanical device indicated generally by the reference numeral 23. As illustrated the electromechanical device 23 includes a U-shaped electromagnet 24, having a winding 25 wound thereon which is connected to the potentiometric network 5 and through which the unbalanced potentiometric currents flow. The electromagnet 25 is disposed in cooperative relation with a plurality of elongated magnetic bars 26 which are spaced along and carried by a non-magnetic endless belt 27. The endless belt 27 is carried by a pair of displaced pulleys 28 and 29 which are supported for rotation by relatively stationary supports 30 and 31, respectively. The pulley 29 is continuously driven by a unidirectional electric motor 32 which receives energizing current through conductors 33 and 34 from the alternating current supply conductors L¹ and L². As shown a variable resistor 35 is provided in the conductor 33 for controlling the supply of current to the motor 32 and thereby the speed of rotation thereof. The motor 32 rotates in the direction to effect movement of the endless belt in the direction shown by the arrow.

The bars of magnetic material are spaced equidistant along the length of the endless belt 27 and pass by the poles of the U-shaped electromagnet 24 in succession. The distance between the bars 26 is desirably the same as the length thereof. As seen in the drawing the gap between the bars 26 and the poles of the magnet 24 is desirably small so as to provide a close coupling between the magnet 24 and the bars 26 when the latter pass by.

When the potentiometric network is in a balanced condition the current flow through the winding 25 of the electromagnet 24 is substantially zero and accordingly the magnetic field established by the latter will also be substantially zero. While this condition exists the bars 26 will not be magnetized when they pass by the poles of the magnet 24. Upon unbalance of the potentiometric network 5 in one direction or the other, however, a current will flow in a corresponding direction through the winding 25 of the magnet 24 to establish a magnetic field in one direction or the other adjacent the poles of the magnet. This magnetic field operates to magnetize the bars 26 in a corresponding direction. That is to say, when the potentiometric network 5 is unbalanced in one direction the leading end of the bars 26 will become a north pole and the trailing end will become a south pole and vice versa.

After the magnetic bars 26 pass by the electromagnet 24 they pass in succession through a plurality of coils 35, 36, 37 and 38, which, as shown, are connected in series with the primary winding 39 of a transformer 40 having a secondary winding 41 which is connected to the input terminals of the amplifier 17. The coils 35–38 are spaced apart from each other a distance approximately equal to the length of the bars 26 and are desirably short in length compared to the length of said bars. As shown, alternate coils 35 and 37 are wound in one direction and alternate coils 36 and 38 are wound in the opposite direction. The reason for winding coils 35, 37 and coils 36, 38 in opposite directions is explained hereinafter. After the individual bars 26 have passed through all of the coils 35–38, they are passed through an elongated coil 42 which is connected to the alternating current supply lines L¹ and L² by conductors 43 and 44 in the latter of which a variable resistance 45 is inserted. The coil 42 operates to demagnetize the bars 26 if the latter have been magnetized in passing by the electromagnet 24, but does not have any effect on the bars 26 if they are not magnetized.

When the bars 26 are not magnetized, they do not produce any effect in passing through the coils 35–38, but when they have been magnetized in one direction or the other, they produce an alternating electromotive force of one phase or of opposite phase across the terminals of each of the coils 35–38. Since the coils 35–38 are connected in series, the sum of the alternating electromotive forces produced across all of them is impressed across the transformer primary winding 39.

Assuming that the bars 26 have been magnetized by the electromagnet 24 in the direction to make their leading end a north pole and their trailing end a south pole, it will be noted that when the leading ends of two of the bars begin to enter the coils 36 and 38 as seen in the drawing, that the trailing ends of the same pair of bars are just about to leave the coils 35 and 37, respectively. As will be apparent to those skilled in the art, the first mentioned bars referred to induce electromotive forces in coils 35 and 37 in the same direction while the last mentioned bars induce electromotive forces in coils 36 and 38 which are in the same direction but opposite that induced in coils 35 and 37. However, since coils 35 and 37 are wound oppositely to coils 36 and 38 as was noted hereinbefore, the electromotive forces induced by each of the coils 35–38 assist each other in tending to establish a current flow through the transformer primary winding 39.

Thus, as will be clear, when the bars 26 have been magnetized in one direction or the other and are passed through the coils 35–38 in this manner that an alternating electromotive force of one phase or of opposite phase will be induced in the coils 35–38 depending upon the direction in which the bars 26 have been magnetized and thereby depending upon the direction of potentiometric unbalance.

In the embodiment of my invention illustrated in the drawing the frequency and the wave shape of the alternating electromotive force so induced in the coils 35–38 are preferably the same as the frequency and the wave shape of the alternating electromotive force supplied by the conductors L¹ and L². As will be clear, this end may be obtained by suitably adjusting the speed at which the magnetic bars 26 are passed through the coils 35–38 and by suitably proportioning the physical dimensions of the magnetic bars 26 with respect to the physical dimensions of the coils 35–38. The speed at which the magnetic bars 26 are passed through the coils 35–38 may be varied in any convenient manner as, for example, by varying the speed of rotation of the unidirectional motor 32. If it is desired to utilize a motor 32 of the synchronous type it is noted that the speed at which the magnetic bars 26 pass through the coils 35–38 may be adjusted to the proper value to produce an alternating electromotive force in the latter of the same frequency as that supplied by the conductors L¹ and L² by suitably proportioning the distance between the bars 26, the length of said bars, the distance between the coils 35–38, and the length of the latter in relation to the speed of operation of the synchronous motor 32. Another manner in which the alternating electromotive force induced in the coils 35–38 may be varied as desired is by providing adjustable gearing mechanism between the motor 32 and the pulley 29.

While only four coils, namely, coils 35–38 have been disclosed in the drawing it will be apparent that a larger or a smaller number of coils may be employed as desired.

The alternating electromotive force produced in the coils 35–38 is amplified by the transformer 40 and the amplifier 17, and the amplified quantity is utilized to selectively energize the reversible electrical motor 11 for rotation in one direction or the other. It is noted the alternating electromotive force impressed on the motor winding 14 by amplifier 17 may be suitably phased with respect to the alternating electromotive force impressed on winding 15 by the supply conductors $L^1$ and $L^2$ by adjusting the position of the coils 35–38 relatively to the position of the electromagnet 24. A tuning condenser 46 may also desirably be connected across the terminals of the transformer secondary winding 41 as shown for adjusting the phase position of the alternating electromotive force impressed on the motor winding 14 by the amplifier 17 and for varying the wave shape of that electromotive force.

It will be apparent that the supply of heating agent to the furnace 1 may be controlled in accordance with the deflection of the recording pen 19 along the chart 20. For example, a reversible electrical motor 47 having two opposed field windings (not shown) may be utilized to adjust a fuel valve 48 disposed in the pipe 49 which supplies fuel to the furnace 1. To this end the reversible motor 47 is energized for rotation in one direction or the other depending upon the direction of deflection of the pen 19 from a predetermined position along the chart 20 which position corresponds to the temperature it is desired to maintain furnace 1.

Specifically, a switch 50 which is actuated in accordance with the adjustments of the recording pen is provided for controlling the energization of the motor 47. The switch 50 comprises a switch arm 51 which is insulated from but is carried by the same support which carries the pen 19 and the potentiometer contact 10, and also two elongated contact segments 52 and 53 which are disposed on opposite sides of the arm 51. The arm 51 is connected by a conductor 54 to the alternating current supply conductor $L^1$. The contact segment 52 is connected by a conductor 55 in which one winding of the motor 47 is inserted to the alternating current supply conductor $L^2$ and the contact segment 53 is connected by a conductor 56 in which the other winding of the motor 47 is inserted to the supply conductor $L^2$.

With the arrangement described when the arm 51 is intermediate the contact segments 52 and 53 the motor 47 is not energized for rotation in either direction, but when the arm 51 is in engagement with the contact segment 52 the motor is energized for rotation in the direction to open the fuel valve 48 and thereby to increase the supply of fuel to the furnace 1. When the arm 51 is in engagement with the contact segment 53 the motor 47 is energized for rotation in the opposite direction and effects a closing adjustment of the valve 48 and thereby a decrease in the supply of fuel to the furnace.

Although not shown the contact segments 52 and 53 of the switch 50 are desirably made adjustable relatively to each other and to the chart 20 so that both the sensitivity and the control point setting of the apparatus may be adjusted in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including means for producing a minute unidirectional electromotive force to be measured, a source of known electromotive force, means to oppose said electromotive forces to derive a differential electromotive force, means to establish a magnetic field in one direction or the other and of an intensity depending upon the polarity and magnitude of said differential electromotive force, a plurality of members composed of magnetic material, a coil, means to subject said members to the influence of said magnetic field to magnetize them and thereafter to subject said coil to the influence of each of said members in succession to induce a fluctuating electromotive force in said coil, and means to utilize the fluctuating electromotive force induced in said coil to effect a balance between said opposed electromotive forces.

2. Measuring apparatus including means for producing a minute unidirectional electromotive force to be measured, a source of known electromotive force, means to oppose said electromotive forces to derive a differential electromotive force, means to establish a magnetic field in one direction or the other and of an intensity depending upon the polarity and magnitude of said differential electromotive force, a plurality of members composed of magnetic material, a coil, means to subject said members to the influence of said magnetic field to magnetize them and thereafter to subject said coil to the influence of each of said members in succession to induce a fluctuating electromotive force in said coil, means to demagnetize said members after said coil has been subjected to the influence thereof whereby said members are conditioned to be again subjected to the influence of said magnetic field, and means to utilize the fluctuating electromotive force induced in said coil to effect a balance between said opposed electromotive forces.

3. Measuring apparatus including means for producing a minute unidirectional electromotive force to be measured, a source of known electromotive force, means to oppose said electromotive forces to derive a differential electromotive force, means to establish a magnetic field in one direction or the other and of an intensity depending upon the polarity and magnitude of said differential electromotive force, a plurality of members composed of magnetic material, a plurality of coils, means to subject said members to the influence of said magnetic field to magnetize them and thereafter to separately subject said coils in succession to the influence of each one of said members to induce an electromotive force in each one of said coils variable in instantaneous polarity depending upon the direction of said magnetic field, means to connect said coils in series in such manner that the electromotive forces induced therein assist each other, and means to utilize the electromotive forces induced in said coils to effect a balance between said opposed electromotive forces.

4. Measuring apparatus including means for producing a minute unidirectional electromotive force to be measured, a source of known electromotive force, means to oppose said electromotive forces to derive a differential electromotive force, means to establish a magnetic field in one direction or the other and of an intensity depending upon the polarity and magnitude of said differential electromotive force, a plurality of members composed of magnetic material, a plurality of coils, means to subject said members to the influence of said magnetic field to magnetize them and thereafter to separately subject said coils in succession to the influence of each one of said members to induce an electromotive force in each one of said coils variable in instantaneous polarity depending upon the direction of said magnetic field, means to connect said coils in series in such manner that the electromotive forces induced therein assist each other, means to demagnetize said members after said coils have been subjected to the influence thereof whereby said members are conditioned to be again subjected to the influence of said magnetic field, and means to utilize the electromotive forces induced in said coils to effect a balance between said opposed electromotive forces.

5. In measuring apparatus comprising a balanceable electrical network adapted to be unbalanced to produce a direct current of one polarity or of opposite polarity depending upon the direction of unbalance of said network, an impedance included in said network adapted to be adjusted to rebalance said network upon unbalance thereof, and means to adjust said impedance, the combination with said means of means energized by said direct current to establish a magnetic field in one direction or the other depending upon the polarity of said direct current, a plurality of members composed of magnetic material, a coil, means to alternately subject said members to said magnetic field to magnetize them and to subject said coil in succession to each of the magnetic fields produced by said members to produce an alternating electromotive force of one phase or of opposite phase therein, means to demagnetize said members before they are subjected to said magnetic field, and means responsive to the alternating electromotive force produced in said coil to control said impedance adjusting means.

6. In measuring apparatus comprising a balanceable electrical network adapted to be unbalanced to produce a direct current of one polarity or of opposite polarity depending upon the direction of unbalance of said network, an impedance included in said network adapted to be adjusted to rebalance said network upon unbalance thereof, and means to adjust said impedance, the combination with said means of means energized by said direct current to establish a magnetic field in one direction or the other depending upon the polarity of said direct current, a plurality of members composed of magnetic material, a coil, means to alternately subject said members to said magnetic field to magnetize them and to subject said coil in succession to each of the magnetic fields produced by said members to produce an alternating electromotive force of one phase or of opposite phase therein, means to demagnetize said members before they are subjected to said magnetic field, and phase responsive means including a reversible electrical motor controlled by the alternating electromotive force produced in said coil to control said impedance adjusting means.

7. In measuring apparatus comprising a balanceable electrical network adapted to be unbalanced to produce a direct current of one polarity or of opposite polarity depending upon the direction of unbalance of said network, an impedance included in said network adapted to be adjusted to rebalance said network upon unbalance thereof, and means to adjust said impedance, the combination with said means of means energized by said direct current to establish a magnetic field in one direction or the other depending upon the polarity of said direct current, a plurality of members composed of magnetic material, a plurality of coils, means to subject said members to said magnetic field to thereby magnetize them and thereafter to pass them in succession through said coils to produce an electromotive force variable in instantaneous polarity depending upon the direction of said magnetic field in each of said coils, means to demagnetize said members after they have passed through said coils, means to connect said coils in series in such manner that the electromotive forces produced therein assist each other, and means responsive to the alternating electromotive force produced in all of said coils to control said impedance adjusting means.

8. In measuring apparatus comprising a balanceable electrical network adapted to be unbalanced to produce a direct current of one polarity or of opposite polarity depending upon the direction of unbalance of said network, an impedance included in said network adapted to be adjusted to rebalance said network upon unbalance thereof, and means to adjust said impedance, the combination with said means of an endless belt, means to support said endless belt, a plurality of elongated members of approximately the same length and composed of magnetic material carried by said belt, said members being arranged end to end and spaced apart a distance approximately equal to the length thereof, means energized by said direct current to establish a magnetic field in one direction or the other depending upon the polarity of said direct current and to which each of said members are subjected in succession and thereby magnetized when said belt is moved, a plurality of spaced coils substantially shorter in length than said members and which are arranged so as to be subjected in succession to the magnetic fields produced by each one of said members when said belt is moved whereby an alternating electromotive force of one phase or of opposite phase depending upon the direction of said magnetic field is produced in each one of said coils, the distance between the centers of said coils being approximately the same as the length of said members, means to connect said coils in series in such manner that the electromotive forces produced in each one of said coils assist each other, means to move said endless belt, means to demagnetize each of said members after all of said coils have been subjected to the magnetic fields established thereby, and phase responsive means controlled by the alternating electromotive forces produced in said coils to control said impedance adjusting means.

9. The combination of claim 8 wherein means are provided to amplify the alternating electromotive forces produced in said coils and said impedance adjusting means includes a reversible electrical induction motor having a pair of windings one of which is energized by the amplifying means, a source of alternating current electromotive force connected to the other motor winding, and means to control the phase position of the alternating electromotive force produced in said coils relatively to the phase position of said alternating current source of electromotive force.

10. In combination, a source of direct current of reversing polarity, means for producing an electromotive force having an alternating component of one phase or of opposite phase in accordance with the polarity of said direct current comprising means energized by said direct current to establish a magnetic field in one direction or the other depending upon the polarity of said direct current, a plurality of members composed of magnetic material, a coil, a demagnetizing coil, and means to alternately subject said members to said magnetic field to magnetize them and to pass them in succession through said first mentioned coil and said second mentioned coil.

11. In combination, a source of direct current of reversing polarity, means for producing an alternating electromotive force variable in instantaneous polarity in accordance with the polarity of said direct current comprising means energized by said direct current to establish a magnetic field in one direction or the other depending upon the polarity of said direct current, a plurality of members composed of magnetic material, a plurality of coils, means to connect said coils in series, and means to subject said members to said magnetic field to magnetize them and thereafter to pass them in succession through said coils.

12. In combination, a source of direct current of reversing polarity, means for producing an alternating electromotive force variable in instantaneous polarity in accordance with the polarity of said direct current comprising means energized by said direct current to establish a magnetic field in one direction or the other depending upon the polarity of said direct current, a plurality of members composed of magnetic material, a plurality of coils, means to subject said members to said magnetic field to thereby magnetize them and thereafter to pass them in succession through said coils to produce an electromotive force variable in instantaneous polarity depending upon the direction of said magnetic field in each of said coils, means to connect said coils in series in such manner that the electromotive forces produced therein assist each other, and means for demagnetizing said members after they have been passed through said coils.

13. In combination, a source of direct current, means for producing an alternating electromotive force variable in instantaneous polarity in accordance with the polarity of said direct current comprising an endless belt, means to support said endless belt, a plurality of elongated members of approximately the same length and composed of magnetic material carried by said belt, said members being arranged end to end along said belt and spaced apart a distance approximately equal to the length thereof, means energized by said direct current to establish a magnetic field in one direction or the other depending upon the polarity of said direct current and to which each of said members are subjected in succession and thereby magnetized when said belt is moved, a plurality of spaced coils substantially shorter in length than said members and which are arranged so as to be subjected in succession to the magnetic fields produced by each one of said members when said belt is moved whereby an alternating electromotive force of one phase or of opposite phase depending upon the direction of said magnetic field is produced in each one of said coils, the distance between the centers of said coils, being approximately the same as the length of said members, means to connect said coils in series in such manner that the electromotive forces produced in each one of said coils assist each other, means to move said endless belt, and means to demagnetize each of said members after all of said coils have been subjected to the magnetic fields established thereby.

14. In combination, a source of direct current, means for producing an alternating electromotive force variable in instantaneous polarity in accordance with the polarity of said direct current comprising an endless belt of non-magnetic material, means to support said belt, a plurality of elongated members of approximately the same length and composed of magnetic material carried by said belt, said members being arranged end to end along said belt and spaced apart a distance approximately equal to the length thereof, a plurality of spaced coils substantially shorter in length than said members, through which said members are adapted to pass in succession when said belt is moved, the distance between the centers of said coils being approximately the same as the length of said members, means energized by said direct current to establish a magnetic field in one direction or the other depending upon the polarity of said direct current and to which each of said members are subjected in succession and thereby magnetized when said belt is moved, means to move said endless belt, and means to demagnetize said members after they have passed through said coils.

EARL A. KEELER.